Inventor:
Walter Roesler
By Joseph Hirschwa
ATTORNEY

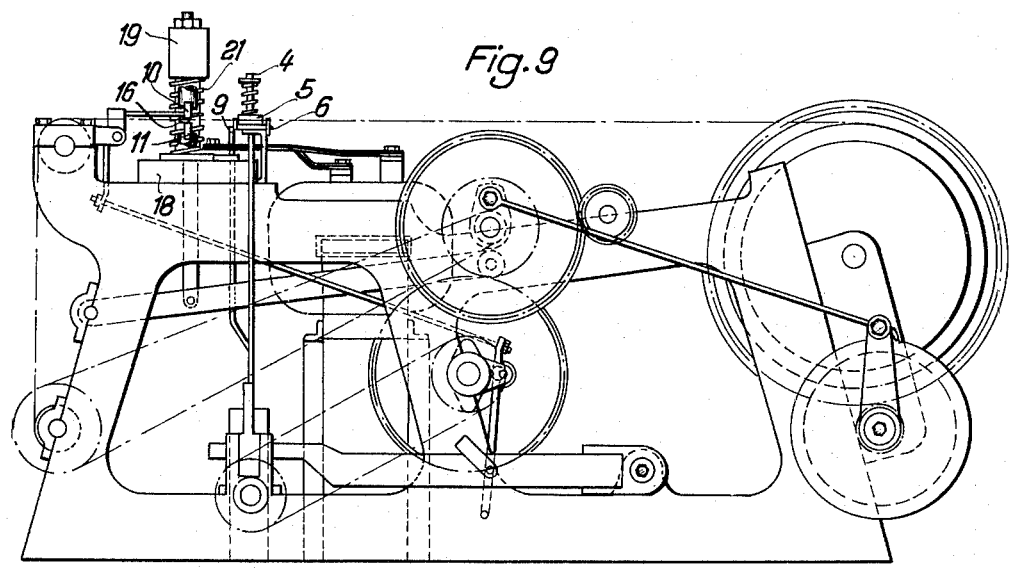
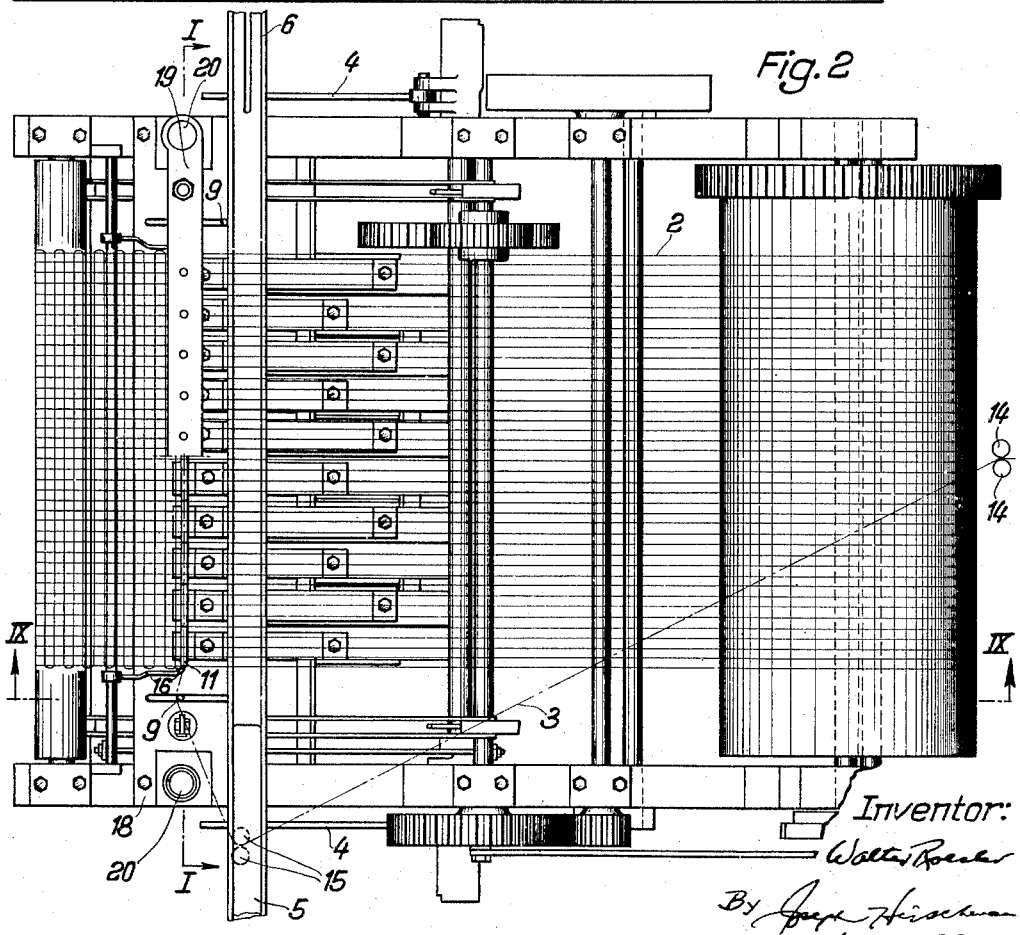

Inventor:
Walter Roesler
By Joseph Hirschwa
ATTORNEY

United States Patent Office 2,813,552
Patented Nov. 19, 1957

2,813,552

PROCESS FOR THE MANUFACTURE OF ELECTRICALLY WELDED WIRE NETS

Walter Roesler, Soest, Germany

Application February 4, 1952, Serial No. 269,800

Claims priority, application Germany February 7, 1951

5 Claims. (Cl. 140—112)

The present invention relates to a method for feeding the cross wire in a machine for the manufacture of electrically welded wire nets from longitudinal and cross wires, in particular for wire nets of large width.

Previously, electrically welded wire nets have been manufactured from longitudinal and cross wires in such a manner that the wire used for the cross wire was pulled from wire coils mounted on rotating carrier disks, by grippers mounted on similar disks and laying the wires between the electrodes on or below the longitudinal wires. This step was carried out in such manner that by the rotation of the disks the coils and grippers arranged thereon approached each other to such an extent that the gripper became capable of clamping the cross wire. Subsequently, by the continued movement of the disks, the cross wire was pulled from the supply coils and laid under initial tension between the electrodes. Thereafter the wire introduced between the electrodes was cut off before, during, or after the welding operation.

It is also known to lay the cross wire under initial tension directly between the electrodes by means of a lever system which moves back and forth before or behind the electrodes and pulls the cross wire from a supply reel or a coil.

The disadvantages of these known methods and devices reside above all in the fact that the means for feeding the cross wire are of complicated construction and liable to be deranged. Even if the width of the net is increased to only a rather small extent such machines must acquire dimensions which makes their economy questionable and their performance is adversely affected by centrifugal forces. Nets of rather large widths cannot be made at all by levers for stringing the cross wires.

It is the object of the invention to remove these disadvantages and to enable the manufacture of very wide wire nets of the type described. In accordance with the invention it is proposed to introduce the cross wire above or below the longitudinal wires by means of a shuttle moved on a straight or curved path, and thereafter to weld the cross wire to the longitudinal wires. This may be carried out in such a manner that the cross wire is fed to the shuttle continuously from a wire supply, reel, coil, or the like, and is pulled from the supply, reel, or the like by the reciprocating motion of the shuttle, and that after the pick the cross wire is laid in the range of the electrodes by means of special feed members; moreover, in other embodiments of the invention, the cross wire is laid directly into the range of the electrodes and the direct introduction of the cross wire into the range of the electrodes may be performed with a shuttle which moves along a straight path and is provided for this purpose with a wire guide casing, or this aim is accomplished with a shuttle moving along a curved path.

Devices for carrying out these methods are characterized by the feature that the shuttle, being preferably shot to and fro by beaters, is provided with at least two guide rolls between which passes the cross wire pulled from the reel or the like. The device may have feed fingers, which move the cross wire forwardly against loop holders and lay it there under initial tension between the electrodes. Moreover, feed fingers arranged on both sides of the wire net may be subjected alternately to an up-and-down motion, and to a back-and-forth motion staggered therefrom, e. g., by 90 deg. In this case the upward movement, which may be controlled by a cam, brings the finger behind the cross wire, which has been laid by the shuttle approximately transversely to the longitudinal direction of the wire net, whereas the forward movement of the finger, which may be controlled during such upward movement by, for example, a stop, causes the finger to press the cross wires before the loop holders arranged adjacent to the electrodes.

By the teaching of the invention it is accomplished, above all, that welded wire nets of any desired widths, even of the largest widths, may be made by means of a machine which has a not much larger width than the width of the work.

The process of the inventor will be further described with the aid of the accompanying drawings wherein there is illustrated by way of example, and in several embodiments, satisfactory apparatus for carrying out the same.

Fig. 2 is a top plan view of the machine shown in Fig. 1, the electrodes which lie above the wire net being omitted.

Fig. 9 is a side elevation of the machine shown in Fig. 2 in the scale of said Fig. 2.

Figure 1:
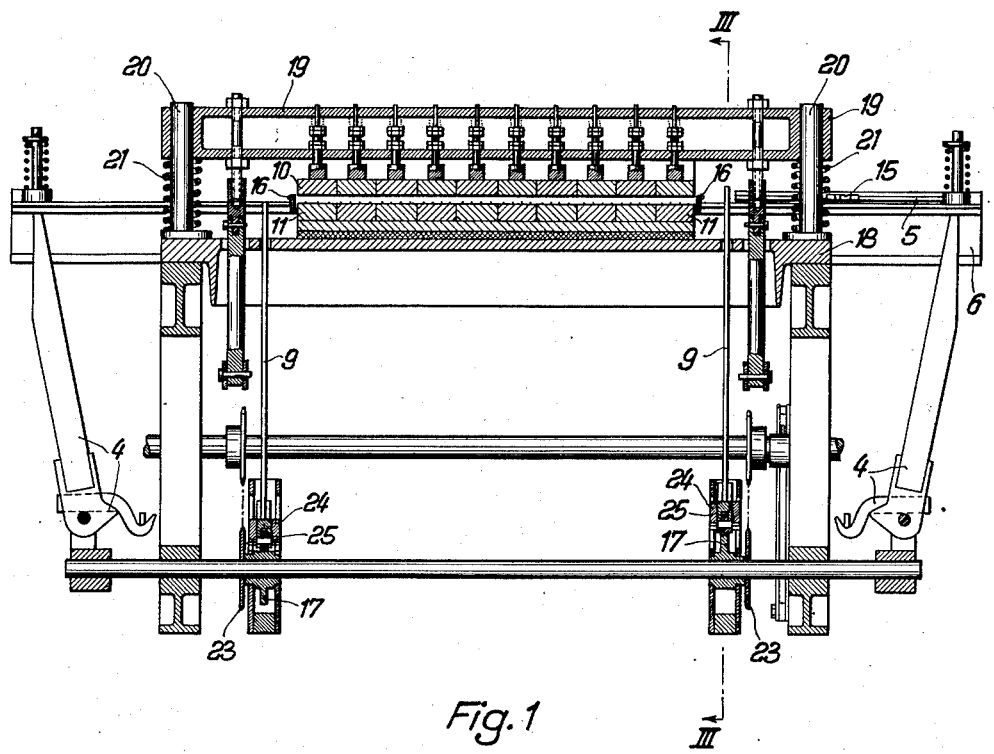
Fig. 1 is a front elevation of the machine, partly in vertical section, along line I—I of Fig. 2, and shows a first embodiment of the machine.
Figure 3:
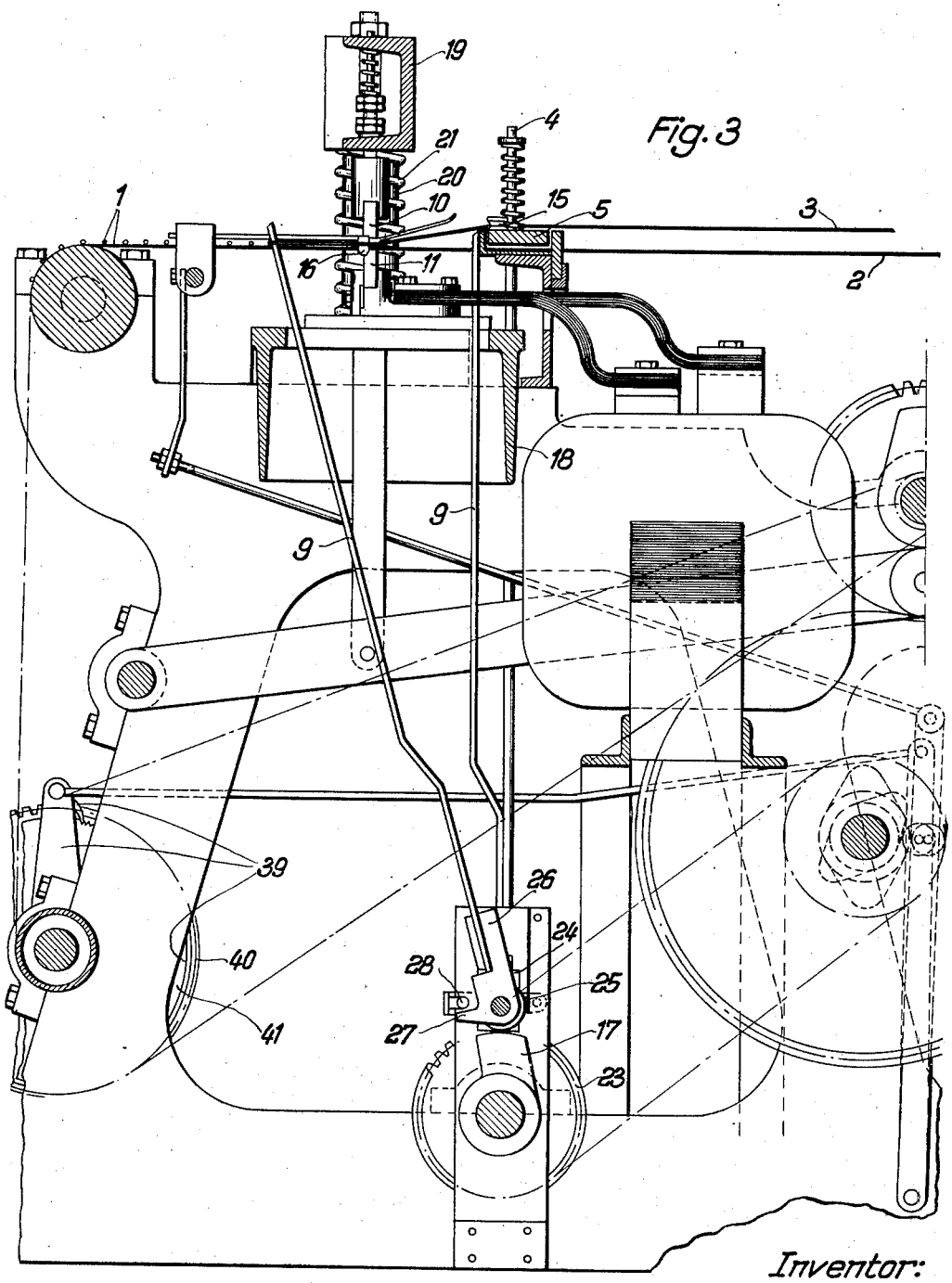
Fig. 3 is an enlarged side elevation of the machine with a partial section along line III—III of Fig. 1, to illustrate especially the operation of the feed fingers.

In accordance with the invention, electrically welded wire nets 1 are manufactured from longitudinal wires 2 and cross wires 3 in such a manner that by means of a shuttle 5 moved by means of beating members, consisting of beaters 4, along a straight raceway 6 or an arcuate raceway 7 (Fig. 6), the cross wire 3 is shot above or below the longitudinal wires 2. The cross wire 3 may be taken from a coil arranged in the shuttle 5. It is preferable, however, to feed the cross wire 3 to the shuttle 5 continuously from a reel 8 (Fig. 6), coil, or the like, and to pull the cross wire from the reel 8 (Fig. 6) or the like by the reciprocating motion of the shuttle 5. After the pick the cross wire 3 is shifted into the range of the electrodes 10, 11 by means of special alternately acting feed members 9. It is also possible, however, to shoot the cross wire directly into the range of the electrodes 10, 11. This direct picking of the cross wire 3 may be effected with the shuttle 5 moving along the straight raceway 6 and provided with a projecting wire guide housing 12 (Fig. 5), or with a shuttle 13 (Fig. 6) moving along an arcuate raceway 7, in which case the feed fingers are dispensed with. In accordance with Figs. 1 to 3 and 9 the manufacture of the wire net 1 proceeds as follows:

Wound on a reel 8 (Fig. 6), the cross wire 3 is guided between two guide rollers 14 and is strung or thrown transversely of the longitudinal wires 2 by means of the shuttle 5, which carries two wire guide rollers 15 and is thrown back and forth by the beaters 4 on the straight raceway 6. The cross wire is caught by loop holders 16 and laid at an angle before the electrodes 10 and 11. That one of the alternately operated feed fingers 9 which is at the side of the machine at which the shuttle has arrived then moves (rises) into position behind the thus strung cross wire 3, which is under initial tension, and forces the cross wire against the loop holders 16 to lay it between the electrodes 10 and 11. The arrangement of the loop holders 16 is such that their front edges are in alignment with the centre of the electrodes 10, 11 to provide for the correct welding position of the cross wire 3, which is pressed against the loop holders 16 by the fingers 9. Moreover, the loop holders 16 have the function of taking up the jerk caused by the sudden pulling of the wire 3 from the supply reel to prevent a sudden contraction of the net 1.

Being arranged on both sides of the wire net 1, the feed fingers 9 are subjected alternately to an up-and-down motion, and to a forward-and-backward motion staggered therefrom, e. g., by 90 degrees. Driven by a gear 23, a cam 17 (in Fig. 8 a double or triple cam 17') lifts a roll 25 sliding in a guide 24. Thereby the feed finger 9, fixed to the roll mounting 26, is moved behind the prestressed cross wire 3. As the upward movement of the roll 25 continues, a nose 27 strikes against a stop 28 whereby the rotatably arranged roll mounting 26 together with the finger 9 is tilted forwardly. At the same time the feed finger 9 pulls the cross wire 3 before one of the two loop holders 16 and between the electrodes 10 and 11. After the two electrodes have been forced together, the welding is effected. During the welding, the cam 17 releases the feed finger 9, which now oscillates back to its initial position. During the welding, means 39 stop the pull-off motion of the wire net 1, e. g., by blocking the friction drive 40 of product beam 41, adapted to receive and to pull off the finished net or nets.

The lower electrode 11 is mounted on a welding table 18. The upper electrode 10 moves resiliently with the welding bridge 19. The latter is held on two guide columns 20 by means of two compression springs 21 to provide for the electrode spacing, which is adjustable. After the cross wire 3 has been laid between the electrodes 10 and 11 the upper bridge 19 is moved vertically by an eccentric, whereby the electrodes 10 and 11 are pressed one against the other. The longitudinal and cross wires lying between the electrodes are welded by the operation of a switch controlled by the machine. When the bridge 19 has been lifted by the said eccentric, and the loop holders have been lifted at the same time, the welded wire net has been released. It is advanced by a winding device in accordance with the set mesh aperture. After the net has advanced by the thickness of the cross wire, the loop holders are quickly dropped behind the last-welded cross wire and then serve alternately for forming the loop at the welding station.

Figure 4:
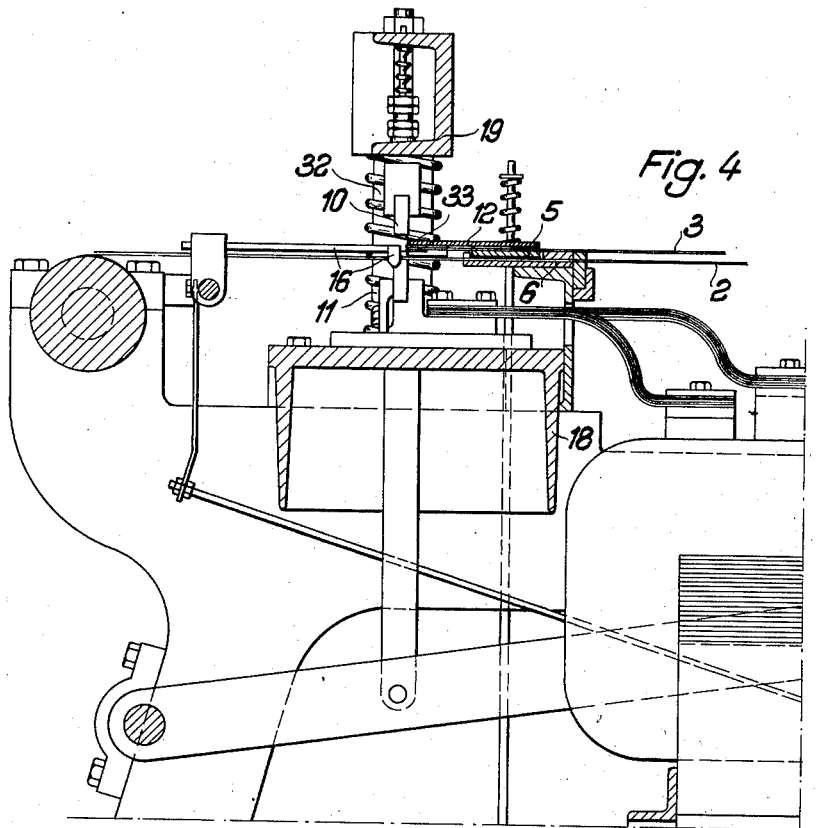
Figs. 4 and 5 are a vertical cross-sectional and a top plan view, respectively, showing another embodiment of the machine, in which the shuttle is also moved along a straight path but the cross wire is shot directly between the electrodes.
Figure 5:
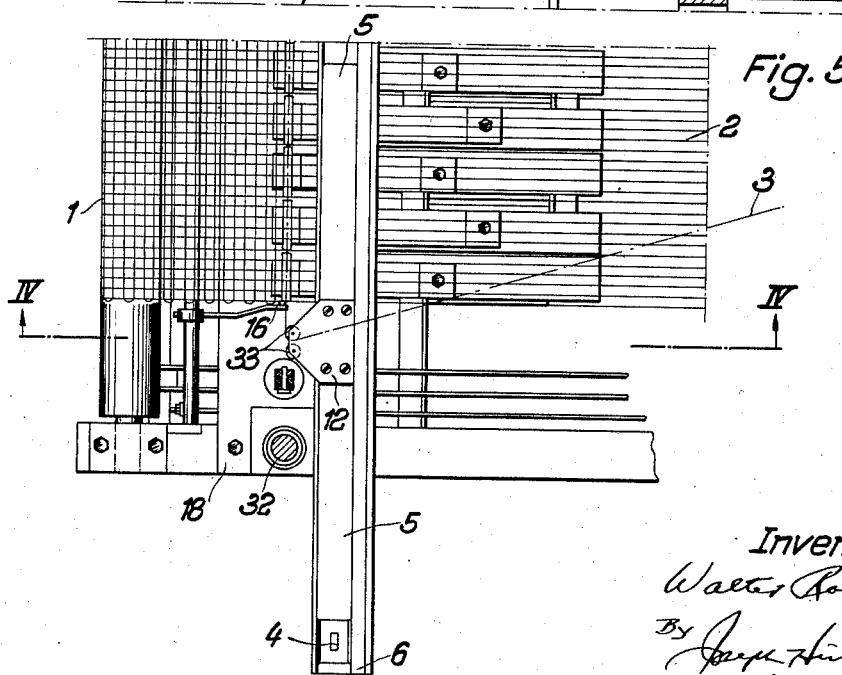

Figs. 4 and 5 show an embodiment for the direct introduction of the cross wire 3 between the electrodes 10 and 11. To this end the shuttle 5 is provided with a projecting feed member 12, which carries wire guide rolls 33. The straight raceway 6 is arranged more closely to the electrodes 10 and 11 while four guide columns 32, to receive the bridge 19, are mounted on the lower welding table 18. As the shuttle 5 moves back and forth, the cross wire 3 is laid before the loop holders 16 and is thus laid directly between the electrodes 10 and 11.

Figure 6:
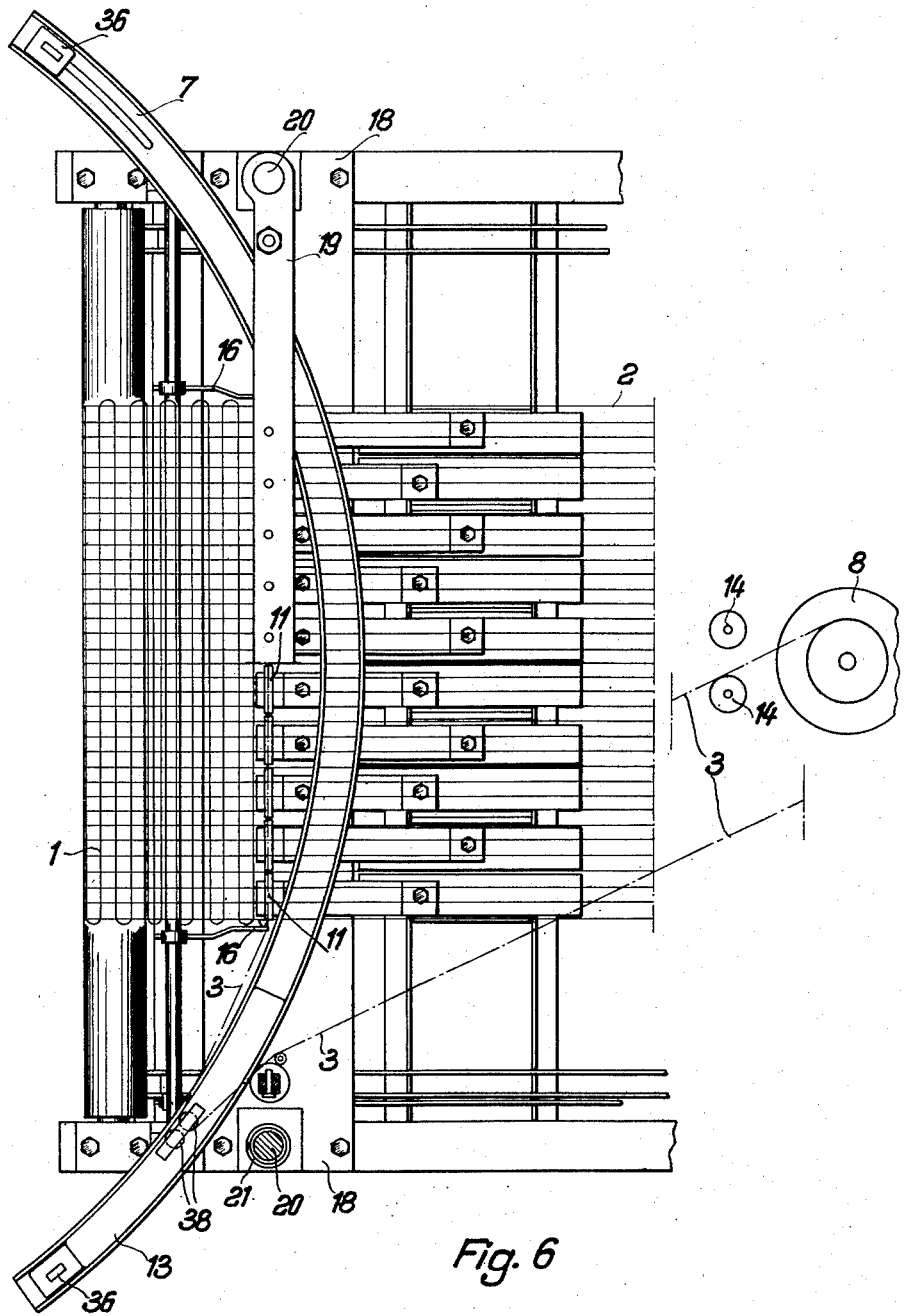
Fig. 6 is a top plan view of a different embodiment of the machine, illustrating a modified mode of operation, in which the shuttle is moved along an arcuate path and the cross wire is shot directly between the electrodes.

Fig. 6 shows an example for the direct introduction of the cross wire 3 between the electrodes 10 and 11 by means of a shuttle 13 moved along an arcuate raceway 7. Being moved back and forth on this arcuate raceway 7 by the beaters 36, the shuttle 13 lays the cross wire 3 directly before the loop holders 16 and thus lays it between the electrodes 10 and 11. Pulled from the reel 8, the cross wire 3 is moved in the shuttle 13 by means of the rolls 38 attached thereto. The construction of the welding table 18 and of the welding bridge 19, and the operation of the latter, correspond to the welding device described hereinbefore.

Figure 8:
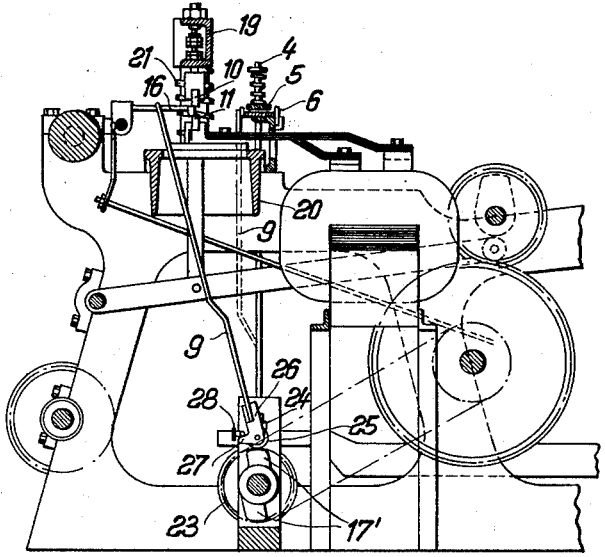
Fig. 8 is a side elevation of the machine shown in Fig. 7.
Figure 7:
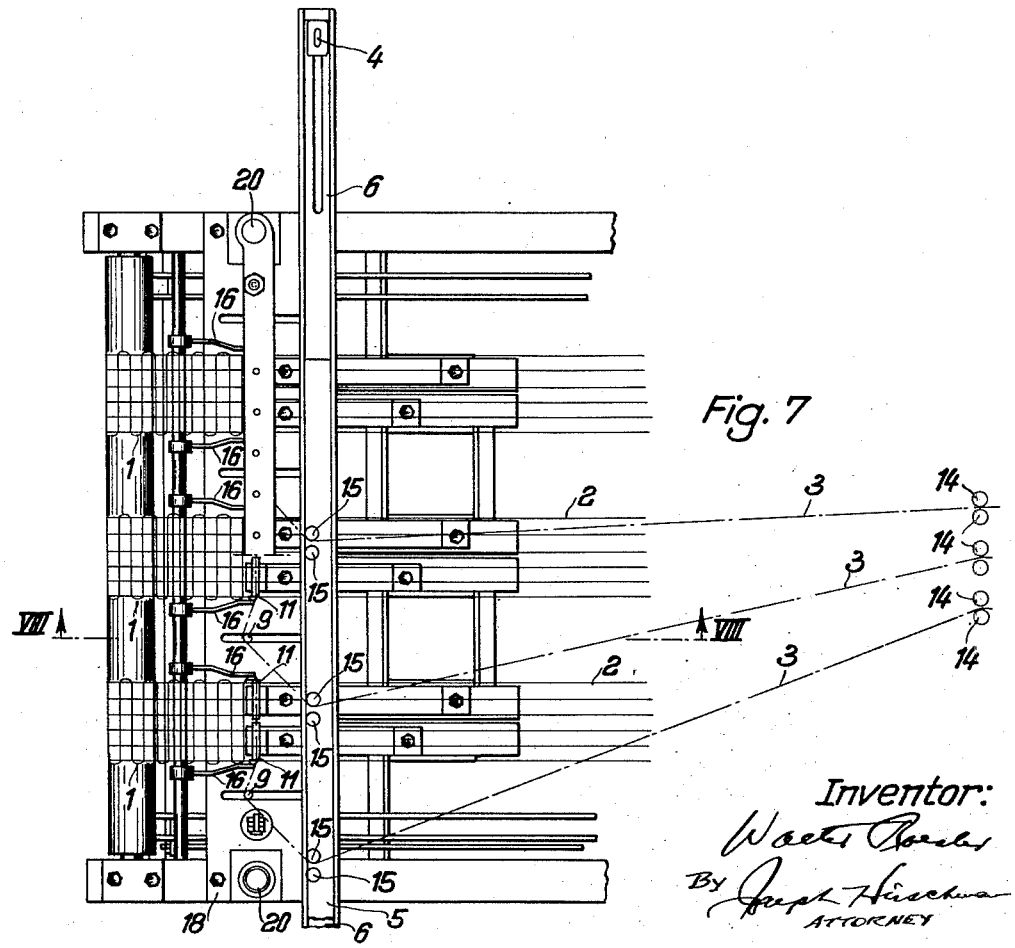
Fig. 7 is a top plan view of a welding stand serving for the simultaneous manufacture of several welded wire nets.

Figs. 7 and 8 show an embodiment of the welding stand as used where several welded nets are to be manufactured at the same time. Figs. 7 and 8 are based on the principle of operation illustrated in Figs. 1 to 3 and 9. Similarly the welding stand shown in Figs. 7 and 8 might be based also on the method of operation shown in Fig. 5.

In Figs. 7 and 8, numerals 1 designate a number of wire nets welded at the crossings and manufactured jointly in a single operation. To this end a number of sets of longitudinal wires are provided, each set serving for the manufacture of one net 1. For this purpose the longitudinal wires 2 are wound on a common warp beam (which may be replaced, of course, by several warp-beams). Numerals 3 designate the cross wires required in addition to the longitudinal wires to manufacture the wire nets. In this embodiment these cross wires are wound on a common reel 8 (Fig. 6), which may of course be replaced by several reels. Neither is it necessary that the cross wires are wound on a reel each, as they may also be taken from a simple cross wire supply. All sets of longitudinal wires 2 have associated therewith a common shuttle race 6, on the straight raceway of which the common shuttle 5 is guided. The common shuttle might be replaced by several, preferably intercoupled shuttles. The common shuttle, however, has the advantage that it need be reciprocated only with an amplitude the size of which corresponds to the width of a single net 1. This leads to a comparatively small travel of the shuttle 5, with a corresponding possible increase of the working cycle of the machine. The shuttle 5 has arranged thereon pairs of guide rolls 15, spaced by fixed equal distances. The several cross wires 3 are fed to the guide rolls 15 from the reel 8. The other ends of the cross wires are laid in zig-zag pattern each, by means of the shuttle 5 and the pairs of rolls 15, so that the nets 1 are formed. The point where the welding electrodes are arranged, in accordance with the embodiment shown in Figs. 1 to 3 and 9, being spaced from the raceway 6 for the shuttle 5, the cross wire running off the pairs of rolls 15 must be moved into its welding position by special means. This is effected again by feed members 9, constructed as shown in Figs. 1 to 3 and 9 so that they have a corresponding control. This control imparts to the feed members 9, in addition to a rising and falling motion, another reciprocating motion in the direction of the longitudinal wires 2, to span the space between the welding electrodes and the raceway. The feed members 9 thus lay the cross wire 3 provided for each wire net 1 before the loop holders 16, to lay it under tension between the welding electrodes 10 and 11, which are shown in Fig. 8. The welding electrodes weld the portion of cross wire which has been laid and shifted into welding position to the corresponding longitudinal wires 2, so that a wire net 1 is formed all over each set of longitudinal wires 2. The motion of the shuttle 5 is effected again with a beating mechanism 4, which may be replaced by any other motion drive.

I claim:

1. Process for the manufacture of wire netting from longitudinal and cross wires which are welded at the points of intersection, comprising tensioning a plurality of transversely spaced longitudinal wires jointly in the longitudinal direction corresponding to the width of the net, conducting at least one transverse wire initially in substantially the same longitudinal direction, imparting to the longitudinal and transverse wires a movement relative to each other in the direction of the longitudinal wires, throwing the cross wire perpendicularly to the direction of the longitudinal wires with formation of a series of zig-zag runs, laying each of said runs against the longitudinal wires at a distance from the line along which it is welded to the longitudinal wires, changing a so-effected oblique position of the cross wire to the longitudinal direction into a position parallel to the last-welded cross run by swinging the wire about the starting point of the oblique position, welding the longitudinal wires and the thrown cross wire to each other when they have reached the final relative position for the net formation, and before the next adjacent, oppositely thrown cross wire is thrown, and stopping said relative movement at least during the welding operation.

2. Process for the manufacture of wire netting from longitudinal and cross wires which are welded at the points of intersection, comprising tensioning a plurality of transversely spaced longitudinal wires jointly in the longitudinal direction and of a number corresponding to the width of the net, throwing a cross wire back and forth transversely to the direction of the longitudinal wires along a line of throw in advance of a welding line with formation of a succession of oblique cross runs and laying such runs in succession against the longitudinal wires, shifting each cross run before the next cross run is thrown relative to the longitudinal wires in the direction of the longitudinal wires to bring the cross wire and longitudinal wires into final relative position at 90° to each other for the net formation, thereupon welding the longitudinal wires and the thrown cross wire to each other along the welding line and before the next adjacent oppositely thrown cross wire is thrown, and moving the longitudinal wires relative to the welding line so as to provide a selected length of mesh opening between successive welds.

3. Process for the manufacture of wire netting from longitudinal and cross wires which are welded at the points of intersection, comprising moving under tension a plurality of transversely spaced longitudinal wires jointly in the longitudinal direction and of a number corresponding to the width of the net, throwing a cross wire back and forth across the longitudinal wires along a line of throw in advance of a welding line and transversely to the direction of the longitudinal wires with formation of a succession of oblique cross runs each extending from an end of a welded cross run and the line of throw, changing a so-effected oblique position of the unwelded cross wire into a position parallel to the last-welded cross run and perpendicular to the longitudinal wires by swinging the wire about the starting point of the oblique position to bring the cross wire to the welding position, welding the cross wire to the longitudinal wires, stopping at such time the movement of the longitudinal wires, continuing the movement of the longitudinal wires, throwing the cross wire in the opposite direction with the formation of a loop outside of the last longitudinal wire defining the edge of the netting at the end of the just-welded cross run and with a spacing from said welded run corresponding to the length of the mesh opening while fixing the cross wire at such loop, again changing a so-effected oblique position of the cross wire in the longitudinal direction into a position parallel to the last-welded cross run by swinging the wire about the starting point of the oblique position, welding the longitudinal wires and the thrown cross wire to each other when they have reached the final relative position for the net formation and before the next adjacent, oppositely thrown cross wire is thrown, and stopping the movement of the longitudinal wires during the welding operation.

4. Process for the manufacture of wire netting from longitudinal and cross wires which are welded at the points of intersection along a welding line, comprising moving under tension a plurality of transversely spaced longitudinal wires jointly in the longitudinal direction and of a number corresponding to the width of the net, holding a cross wire laterally of the welding line and throwing such wire transversely of the longitudinal wires along an arc open to the welding line, whereby the cross wire is laid across the longitudinal wires as the chord of such arc and finally along the welding line, welding the longitudinal wires and the thrown cross wire to each other at said welding line and before the next adjacent oppositely thrown cross wire is strung, and stopping the movement of the longitudinal wires during the welding operations.

5. Process for the manufacture of wire netting from longitudinal and cross wires which are welded at the points of intersection along a welding line, comprising moving under tension a plurality of transversely spaced longitudinal wires jointly and step by step in the longitudinal direction, the longitudinal wires being of a number corresponding to the width of the net, holding a cross wire at one end laterally of the welding line and throwing it transversely of the longitudinal wires, whereby a loop is formed at one side of the net and at the welding line, arranging the cross wire at right angles to the longitudinal wires at the welding line and welding the wires to each other at such line, holding the cross wire laterally of the welding line at the opposite side of the net and throwing the wire transversely of the longitudinal wires so as to form a loop at said opposite side of the net while advancing the longitudinal wires for a distance corresponding to a mesh, and stopping the movement of the longitudinal wires during the welding operations.

References Cited in the file of this patent
UNITED STATES PATENTS

| | | |
|---|---|---|
| 1,908,050 | Reed | May 9, 1933 |
| 1,961,991 | Southwell | June 5, 1934 |
| 2,000,788 | Reed | May 7, 1935 |
| 2,410,766 | Wickwire | Nov. 5, 1946 |
| 2,448,941 | Wickwire | Sept. 7, 1948 |